US007724557B2

(12) United States Patent
Ganta Papa Rao Bla et al.

(10) Patent No.: US 7,724,557 B2
(45) Date of Patent: May 25, 2010

(54) ELECTRICAL WIRING DEVICE WITH A CENTER NIGHTLIGHT HAVING AUTOMATIC AND MANUAL CONTROL FEATURES

(75) Inventors: Kapil Rao Ganta Papa Rao Bla, Syracuse, NY (US); Jeffrey C. Richards, Baldwinsville, NY (US); Gerald R. Savicki, Jr., Canastota, NY (US); Richard Weeks, Little York, NY (US); Gary O. Wilson, Syracuse, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 365 days.

(21) Appl. No.: 11/933,951

(22) Filed: Nov. 1, 2007

(65) Prior Publication Data

US 2009/0033247 A1 Feb. 5, 2009

Related U.S. Application Data

(63) Continuation-in-part of application No. 11/609,793, filed on Dec. 12, 2006, now Pat. No. 7,312,394, and a continuation-in-part of application No. 11/294,167, filed on Dec. 5, 2005, which is a continuation-in-part of application No. 11/242,406, filed on Oct. 3, 2005, now Pat. No. 7,285,721, which is a continuation-in-part of application No. 10/726,128, filed on Dec. 2, 2003, now Pat. No. 6,989,489.

(51) Int. Cl.
*H02M 1/00* (2007.01)

(52) U.S. Cl. .......................... 363/146; 439/687; 174/53

(58) Field of Classification Search ......... 363/141–146; 439/95, 101–107, 211–216, 207, 677, 687; 53/53, 55, 57, 58, 67, 61; 362/95, 276, 364
See application file for complete search history.

(56) References Cited

U.S. PATENT DOCUMENTS 3,588,489 A * 6/1971 Gaines ........................ 362/95

(Continued)

*Primary Examiner*—Rajnikant B Patel
(74) *Attorney, Agent, or Firm*—Daniel P. Malley; Bond, Schoeneck & King, PLLC

(57) ABSTRACT

The present invention is directed to a electrical wiring device that includes a housing having a plurality of line terminals. A cover assembly is coupled to the housing, the cover assembly including at least one set of receptacle openings disposed on either side of a central portion of the cover assembly. A plurality of receptacle terminals are disposed in the housing, each of the plurality of receptacle terminals being coupled to a corresponding one of a plurality of load terminal structures. Each of the plurality of receptacle terminals is in communication with a corresponding one of the at least one set of receptacle openings. A light assembly is disposed in the central portion of the cover assembly and coupled to the plurality of line terminals or the plurality of load terminals. The light assembly has a light transmission region disposed in the central portion. The light transmissive region occupies a substantial portion of a width of the cover assembly. An automatic control mechanism is coupled to the light assembly and configured to selectively drive the light assembly from a deenergized state to a light emitting state in response to a predetermined stimulus. A manual control mechanism is coupled to the light assembly and configured to selectively regulate the amount of light transmitted by the light assembly when in the light emitting state.

25 Claims, 5 Drawing Sheets

U.S. PATENT DOCUMENTS

| | | | | | |
|---|---|---|---|---|---|
| 4,737,903 | A | * | 4/1988 | Nishikawa et al. | 363/144 |
| 5,413,501 | A | * | 5/1995 | Munn | 439/535 |
| 6,061,261 | A | * | 5/2000 | Chen et al. | 363/146 |
| 6,111,772 | A | * | 8/2000 | Lee et al. | 363/146 |
| 6,883,927 | B2 | * | 4/2005 | Cunningham et al. | 362/95 |
| 7,036,948 | B1 | * | 5/2006 | Wyatt | 362/95 |
| 7,118,235 | B2 | | 10/2006 | Barton | |
| 2006/0262462 | A1 | | 11/2006 | Barton | |

* cited by examiner

ELECTRICAL WIRING DEVICE WITH A CENTER NIGHTLIGHT HAVING AUTOMATIC AND MANUAL CONTROL FEATURES

CROSS-REFERENCE TO RELATED APPLICATIONS

This is a continuation-in-part of U.S. patent application Ser. No. 11/609,793 filed on Dec. 12, 2006 and U.S. patent application Ser. No. 11/294,167 filed on Dec. 5, 2005, which is a continuation-in-part of U.S. patent application Ser. No. 11/242,406 (Now U.S. Pat. No. 7,285,721) filed on Oct. 3, 2005, which is a continuation application of U.S. patent application Ser. No. 10/726,128 (now U.S. Pat. No. 6,989,489), the contents of which are relied upon and incorporated herein by reference in its entirety, and the benefit of priority under 35 U.S.C. §120 is hereby claimed, U.S. patent application Ser. No. 10/726,128 claims the benefit of priority under 35 U.S.C. §119(e) to U.S. Provisional Patent Application 60/439,370 filed Jan. 9, 2003.

BACKGROUND OF THE INVENTION

1. Field of the Invention

The present invention relates generally to electrical wiring devices, and particularly to electrical wiring devices having safety features.

2. Technical Background

The AC power interface for the typical electrical distribution system is commonly known as the breaker panel. The size of the breaker panel may vary depending on whether it is disposed within a residence, commercial building or some other such facility. The breaker panel, of course, terminates the AC power service provided by the power utility and distributes AC power to one or more branch electric circuits installed in the structure. Branch electric circuits often include one or more electrical wiring devices, such as receptacle outlets, that accommodate electrical power plugs.

Electrical wiring devices are provided in electrically non-conductive housings. The housing includes electrical line terminals that are electrically insulated from electrical load terminals. The line terminals connect the wiring device to conductive wires from the breaker panel. Load terminals are connected to downstream wiring that is configured to propagate AC power to one or more downstream electrical loads. Those of ordinary skill in the pertinent art will understand that the term “load” refers to an appliance, a switch, or some other electrically powered device. The load terminals of an electrical wiring device are sometimes referred to as “feed-through” terminals. As alluded to above, the AC power propagating through a device may be accessed by the user by way of a power plug. As everyone knows, the power plug and cord assembly for a portable electrical device functions as a portable device’s AC power interface. A receptacle outlet provide power to portable “user-accessible loads” when the plug is inserted into a receptacle outlet. Certain types of faults are known to occur in branch electric circuits and electrical wiring systems. These faults represent serious safety issues that may result in fire, shock or electrocution if not addressed properly.

Accordingly, branch electric circuits typically employ one or more electric circuit protection devices. Protective devices employ a circuit interrupter disposed between the line terminals and the load terminals. The circuit interrupter provides power to the load terminals under normal conditions, but breaks electrical connectivity when the protective device detects a fault condition in the load circuit. There are several types of electric circuit protection devices including ground fault circuit interrupters (GFCIs), ground-fault equipment protectors (GFEPs), arc fault circuit interrupters (AFCIs), transient voltage surge suppressors (TVSSs), or surge protective devices (SPDs). This list includes representative examples and is not meant to be exhaustive. Some devices include both GFCIs and AFCIs.

Another safety issue that is of great concern relates to the amount of ambient lighting in a given room or space. In a scenario that most people are familiar with, a person entering a darkened room will usually attempt to locate the wall switch and turn the wall switch to the ON position before entering. Sometimes the wall switch is not located near the door, i.e., at the point of entry, and the person will begin to search for the light switch. This person begins to “feel” her way around the darkened room in an attempt to navigate around objects such as tables and chairs. More often than not, the person successfully finds the wall switch and manages to turn the lights ON. On the other hand, the darkened room represents a safety issue. For example, if an object is disposed relatively low to the floor surface the person may trip over it and suffer an injury. This scenario applies to other types of spaces, such as corridors, theater aisles, stairways, patios, garages, ingress/egress areas, out-buildings, outdoor pathways and the like.

There are situations where a light switch is not available, or is not readily available. There are other situations where the person entering the darkened room is disinclined to turn the lights ON as a matter of courtesy. Several examples immediately come to mind. A person entering a darkened theatre would expect to incur the wrath of his fellow patrons if he turned the theatre lights ON while finding a seat. In another situation, a person may desire to temporarily enter a room occupied by a person who is sleeping. For example, a parent may want to check on the condition of a sleeping infant, or tend to someone who is ill, without having to turn the lights ON.

In one approach that has been considered, a portable lighting device may be inserted into an electrical receptacle located in the room to function as a “night light.” While this arrangement may provide a temporarily solution to the potentially unsafe condition described above, it has certain drawbacks associated with it. The most obvious drawback in getting the portable nightlight into a socket in a darkened room is finding the socket in the first place. While this problem may be eliminated with forethought, many people live busy lives and have other things on their minds. On the other hand, once the night light is inserted into the receptacle, it may remain there day and night for an extended period of time and represent a waste of energy. After awhile, the resident may notice the problem and unplug the light during daylight hours if the space admits natural light. Unfortunately, the resident may forget to plug the light back into the socket until after night fall and finds himself revisiting the darkened room scenario. In addition, once a small night light is unplugged from the receptacle there is the possibility that it will become lost, misplaced, or damaged from excessive handling.

In another approach that has been considered, a light element may be disposed in a wiring device in combination with another functional element such as a receptacle or a light switch. The wiring device is subsequently installed in a wall box or mounted to a panel. While this approach obviates some of the drawbacks described above, there are other drawbacks that come into play. Conventional permanent lighting elements such as incandescent and neon lights have a relatively short life expectancy of only a few years and, therefore, require periodic servicing and/or replacement. This problem is exacerbated by the fact that the light is typically hard-wired to power contacts disposed in the wiring device. As such, the light element is permanently ON, further limiting the light elements life expectancy of the device.

In yet another approach that has been considered, the aforementioned drawbacks are addressed by providing a light sensor, and the associated circuitry, to control the light element. When the sensor detects the ambient light level falling past a certain point, the control circuit turns the light element ON. One design problem associated with using a light sensor to selectively actuate the light element relates to providing a proper degree of isolation between the light sensor and the light element. Conventional devices solve the problem by separating the light sensor and the light element by as great a distance as possible. As such, conventional devices are typically arranged such that the lens covering the light element is disposed in one portion of the wiring device cover and the sensor element is disposed in a second portion of the cover, with sufficient space therebetween. If the wiring device includes another functional element such as a receptacle, the sensor may be disposed between the receptacle and the light's lens cover. Because the light sensor must be disposed a sufficient distance away from the light element, it necessarily requires that the lighting assembly be reduced in size to fit the wiring device form factor. Accordingly, conventional devices of this type often fail to provide an adequate amount of illumination for the intended application and, therefore, do not address the safety concern in a satisfactory manner.

What is needed is an electrical wiring device that includes a light source that is both adapted to a wiring device form factor and configured to address the drawbacks and needs described above. A light emitting wiring device is needed that provides a sufficient amount of illumination when the ambient light in a given space falls below a safe level. The wiring device must maximize the effective area of illumination without sacrificing sensor isolation. What is also needed is a wiring device that addresses both safety issues, i.e., electrical fault conditions as well as ambient lighting issues.

SUMMARY OF THE INVENTION

The present invention addresses the needs described above by providing an electrical wiring device that includes a light source that is both adapted to a wiring device form factor and configured to address the drawbacks and needs described above. The wiring device of the present invention may be configured to address both safety issues, i.e., electrical fault conditions as well as ambient lighting issues.

One aspect of the present invention is directed to an electrical wiring device that includes a housing having a plurality of line terminals. A cover assembly is coupled to the housing, the cover assembly including at least one set of receptacle openings disposed on either side of a central portion of the cover assembly. A plurality of receptacle terminals are disposed in the housing, each of the plurality of receptacle terminals being coupled to a corresponding one of a plurality of load terminal structures. Each of the plurality of receptacle terminals is in communication with a corresponding one of the at least one set of receptacle openings. A light assembly is disposed in the central portion of the cover assembly and coupled to the plurality of line terminals or the plurality of load terminals. The light assembly has a light transmission region disposed in the central portion. The light transmissive region occupies a substantial portion of a width of the cover assembly. An automatic control mechanism is coupled to the light assembly and configured to selectively drive the light assembly from a deenergized state to a light emitting state in response to a predetermined stimulus. A manual control mechanism is coupled to the light assembly and configured to selectively regulate the amount of light transmitted by the light assembly when in the light emitting state.

In another aspect, the present invention is directed to an electrical wiring device that includes a housing including at least one hot connection mechanism and at least one neutral connection mechanism. A cover assembly is coupled to the housing, the cover assembly including at least one set of receptacle openings disposed on either side of a central portion of the cover assembly. A plurality of receptacle terminals are disposed in the housing and coupled to the at least one hot connection mechanism and the at least one neutral connection mechanism. The plurality of receptacle terminals are in communication with each of the at least one set of receptacle openings. A light assembly is disposed in the central portion of the cover assembly and coupled to the at least one hot connection mechanism and the at least one neutral connection mechanism. The light assembly has a light transmission region disposed in the central portion. The light transmissive region occupying a substantial portion of a width of the cover assembly. A light control mechanism is coupled to the light assembly and configured to selectively drive the light assembly from a deenergized state to a light emitting state in response to a predetermined stimulus. The light control mechanism also is configured to selectively regulate the amount of light transmitted by the light assembly when in the light emitting state.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 3:
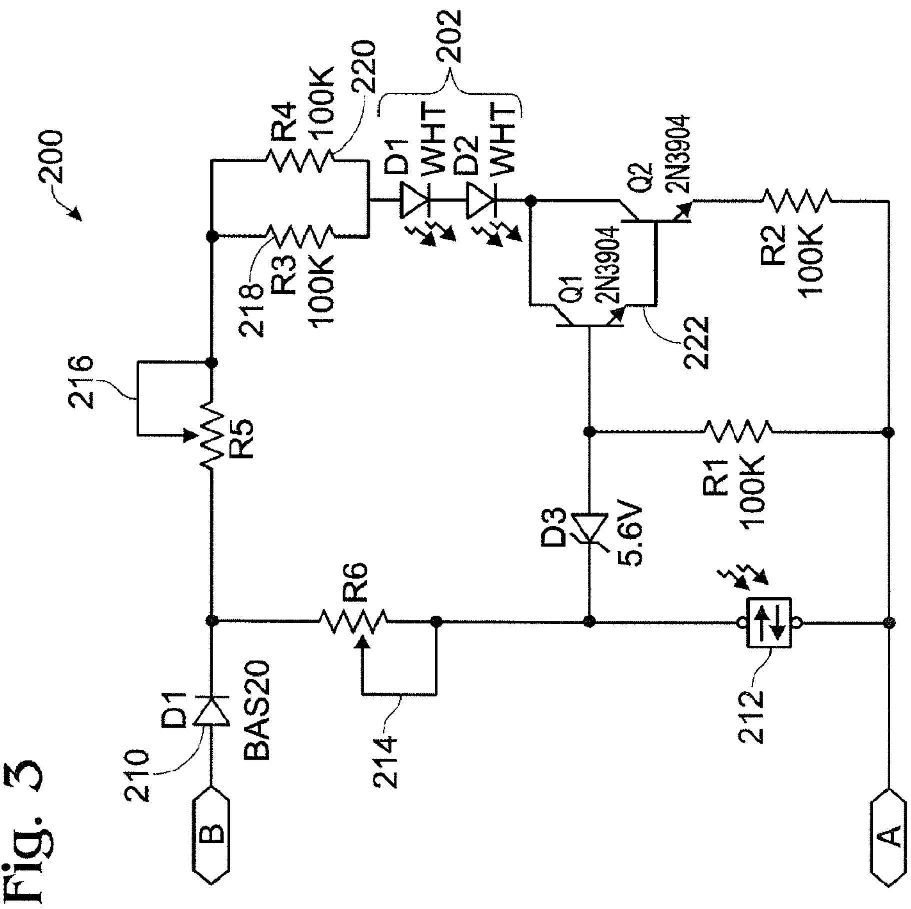
FIG. 3 is a schematic of the center night light assembly in accordance with one embodiment of the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the electrical wiring device of the present invention is shown in FIG. 1, and is designated generally throughout by reference numeral 10.

Figure 1:
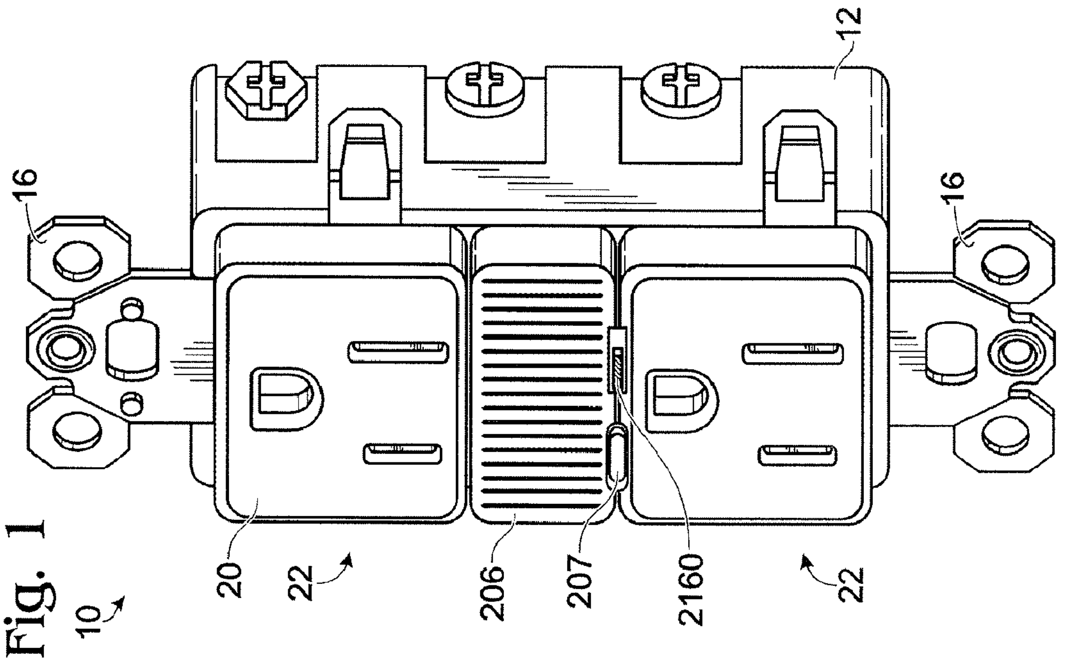
FIG. 1 is a perspective view of the fully assembled device in accordance with the present invention.

As embodied herein and depicted in FIG. 1, is a perspective view of a fully assembled electrical wiring device in accordance with the present invention is shown. In this embodiment, device 10 is a receptacle outlet device with center night light assembly 200. The cover assembly 20 includes receptacle openings 22, disposed at either end, and a center night light lens 206. Lens 206 is quite large, and covers almost one-third of the surface area of the cover 20. Sensor lens 207 and a manual glider control lever 2160 are shown as being disposed in the bottom edge of the lens 206. However, these elements may be disposed along any peripheral edge of lens 206 in alternate embodiments of the present invention.

Figure 2:
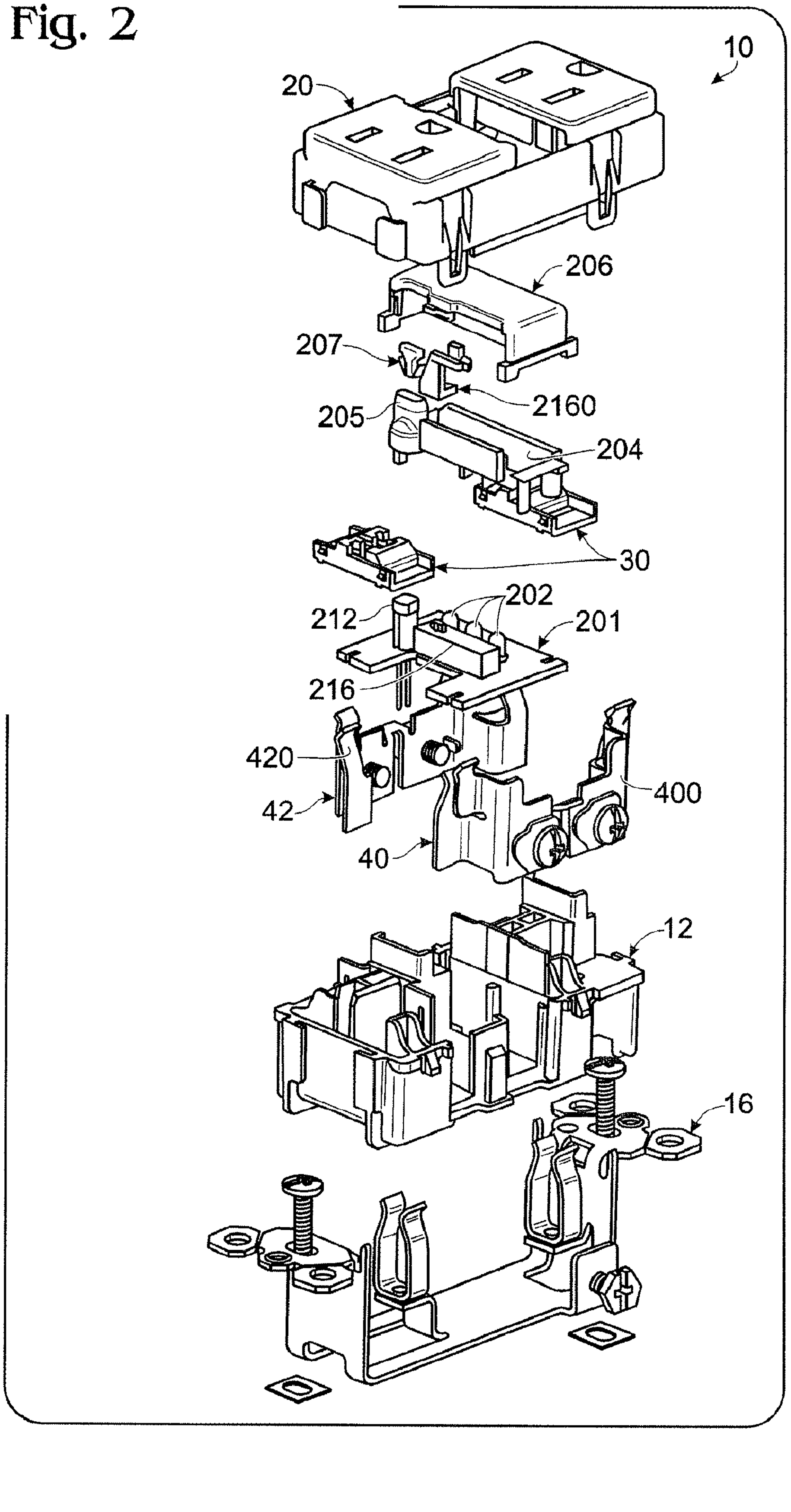
FIG. 2 is an exploded view of the device depicted in FIG. 1.

FIG. 2 is an exploded view of the electrical wiring device depicted in FIG. 1. Again, cover member 20 includes receptacle openings 22 disposed at either end of a central portion that has an opening 208 formed therein. Opening 208, of course, is configured to accommodate lens element 206. The lens 206 is configured to mate with reflector member 204 which includes white LEDs 202 disposed therein. The LEDs 202 are connected to pig tailed wires connected across receptacle terminal structures 40, 42. Of course, the cover member 20 also accommodates shutters 60.

Of course, the hot and neutral receptacle terminals (40, 42) are disposed within back body member 12. When the ground strap structure 16 is inserted into body member 12 from behind, the hot receptacle terminals 420, the neutral receptacle terminals 400, and the ground terminals 160 are perfectly aligned with their respective face receptacle openings 22 in cover 20. Note that the printed circuit board includes potentiometer 216. Potentiometer 216 is mechanically coupled to glider element 2160. Of course, the glider 2160 provides the user with the means for controlling potentiometer 216.

Referring to FIG. 3, a schematic of the center night light assembly in accordance with one embodiment of the present invention is shown. The PCB 201 receives power from the receptacle terminals 40, 42. When the ambient light is above a certain level, light sensor 212 reacts to the ambient light level and diode D3 begins to conduct. In one embodiment, sensor 212 is implemented using a light sensing diode and the amount of current conducted by sensor 212 is related to the amount of incident ambient light. As the ambient light increases past a predetermined level, which may be adjusted by potentiometer R6 in the factory, the Darlington transistor pair (Q1, Q2) are turned OFF. In particular, the current flow through D4 pulls down the base of transistor Q1. Q1, in turn, pulls down the base of Q2. When the ambient light begins to decrease, e.g., as night falls, the current flowing through sensor 212 begins to decrease accordingly. At some predetermined ambient light level, the current flowing through sensor 212 diminishes to the point where a current flow through diode D3 and resistor R1 is established. Subsequently, the transistors Q1 and Q2 are turned ON collector/emitter current in Q2 flows energizing LEDs 202.

In the schematic shown in FIG. 3, a dimmer potentiometer 216 is provided, allowing the user to adjust the brightness of the LEDs 202. In another embodiment, light sensor 212 may be implemented using a light sensing variable resistor. In this embodiment, sensor 212 and resistor 214 function as a voltage divider. Therefore, the voltage presented to diode D3 changes in accordance with the variable resistance of sensor 212. Additional features and benefits may be included. For example, the circuit may be configured to provide hysteresis. For example, the amount of ambient light at which LEDs 202 turn ON may differ from the amount of ambient light at which LEDs 202 turn OFF in accordance with the selected hysteresis curve. LEDs 202 can only be energized when two conditions are met. Device 10 must be reset and the ambient light level must fall below a predetermined level. Thus, the light assembly 200 in this embodiment is not a reset indicator per se.

In another embodiment of the present invention, the sensor circuitry may be replaced, or augmented by, proximity, motion sensing, or temperature sensing circuitry. While the sensor circuitry may function as strictly an ON/OFF control of the nightlight assembly 200, it may also be configured to regulate the power to the nightlight such that the luminous intensity is proportional to the incident ambient light. Reference is made to U.S. patent application Ser. No. 11/294,167, which is incorporated herein by reference as though fully set forth in its entirety, for a more detailed explanation of this type of light sensor circuitry.

Figure 4:
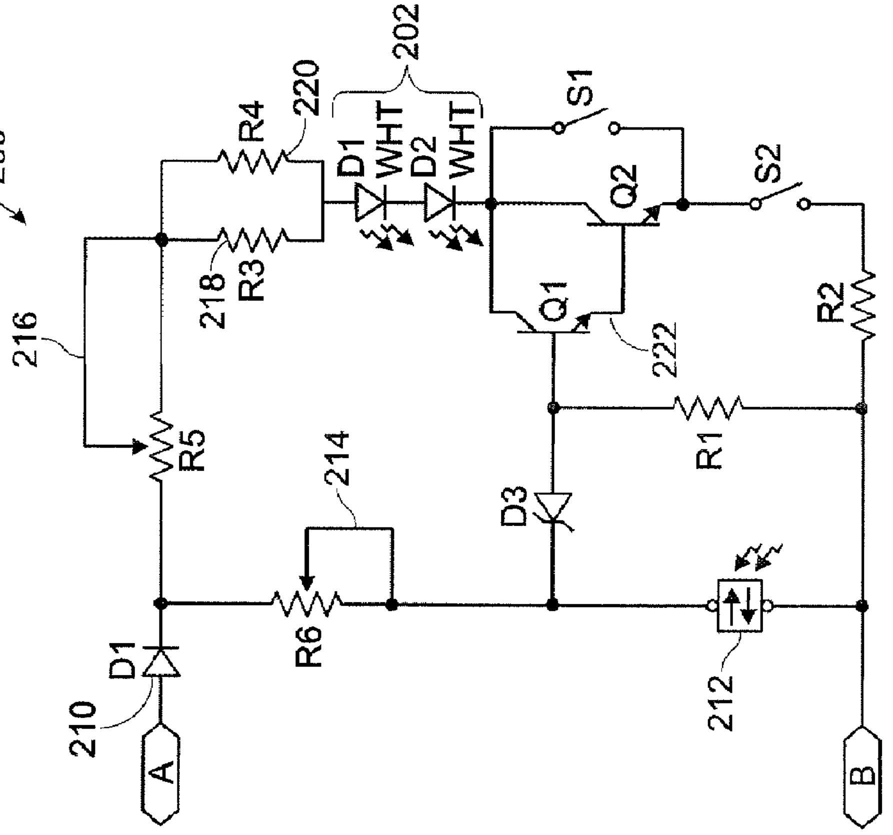
FIG. 4 is a schematic of the center night light circuit in accordance with another embodiment of the present invention.

FIG. 4 is a schematic of the center night light circuit in accordance with a second embodiment of the present invention. The circuit depicted herein is similar to the one shown in FIG. 3 except that dimmer potentiometer 216 is coupled to a switch S1 that is normally in the open position. Switch S1 is coupled in parallel with transistors Q1 and Q2. When the user goes beyond one of the adjustment limit of potentiometer 216, switch S1 is configured to close to provide a "full-on" bypass. In this mode, the LEDs are fully lit regardless of the intensity of the ambient light.

The dimmer potentiometer 216 is also coupled to a switch S2 that is normally in the closed position. Switch S2 is connected in series with transistors Q1 and Q2. When the user adjusts potentiometer 216 beyond the other adjustment limit of potentiometer 216, switch S2 is configured to open to provide a "full-off" bypass. In this mode, the LEDs are never lit regardless of the intensity of the ambient light. Those of ordinary skill in the art will understand that switch S1 and switch S2 may be used alone or in combination with each other.

Figure 5:
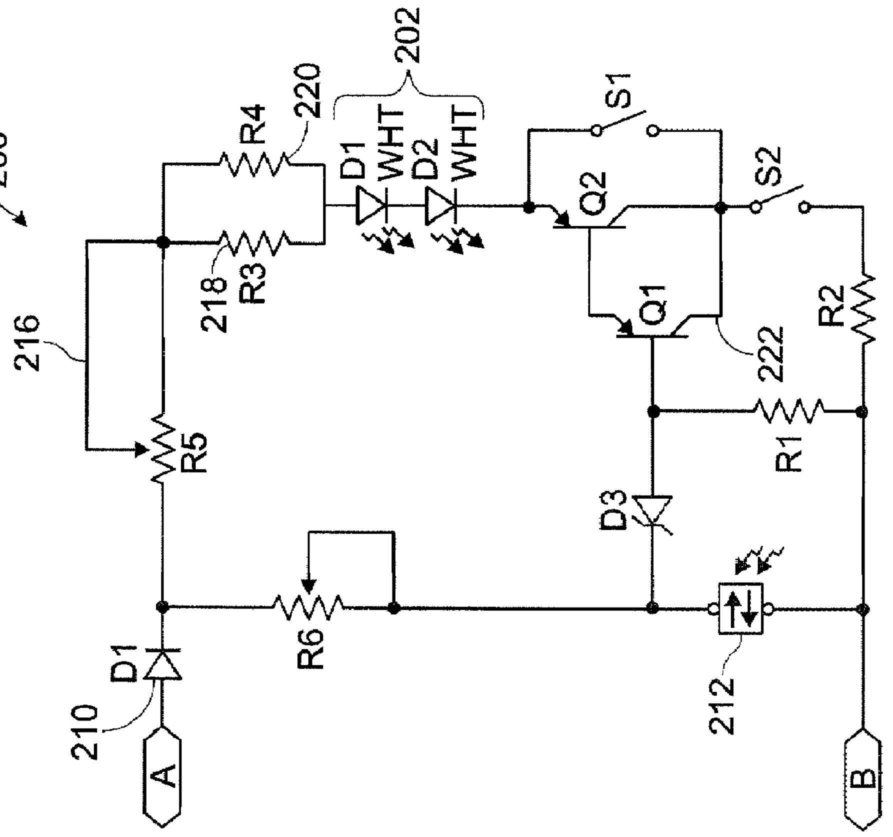
FIG. 5 is a schematic of the center night light assembly in accordance with another embodiment of the present invention.

FIG. 5 is a schematic of the center night light circuit in accordance with a third embodiment of the present invention. In this embodiment, light assembly 200 is an "intelligent pilot light," meaning that more light is emitted in response to a greater amount of room ambient light. Photosensitive device 212 conducts an amount of current governed by the intensity of ambient light. When the intensity of the ambient light increases beyond some preset value, the current propagating through D3 will turn on Q1 and Q2. As a result, diodes D1 and D2 emit light. As the room ambient light increases, Q1 and Q2 are ON for a longer duty cycle and D1 and D2 emit an increasing intensity of light. Dimmer potentiometer 216 allows a user to adjust the intensity of the light emitted by D1 and D2. Switch S1 or S2 may be included. They provide a similar functionality to S1 and S2 described in FIG. 4.

Figure 6:
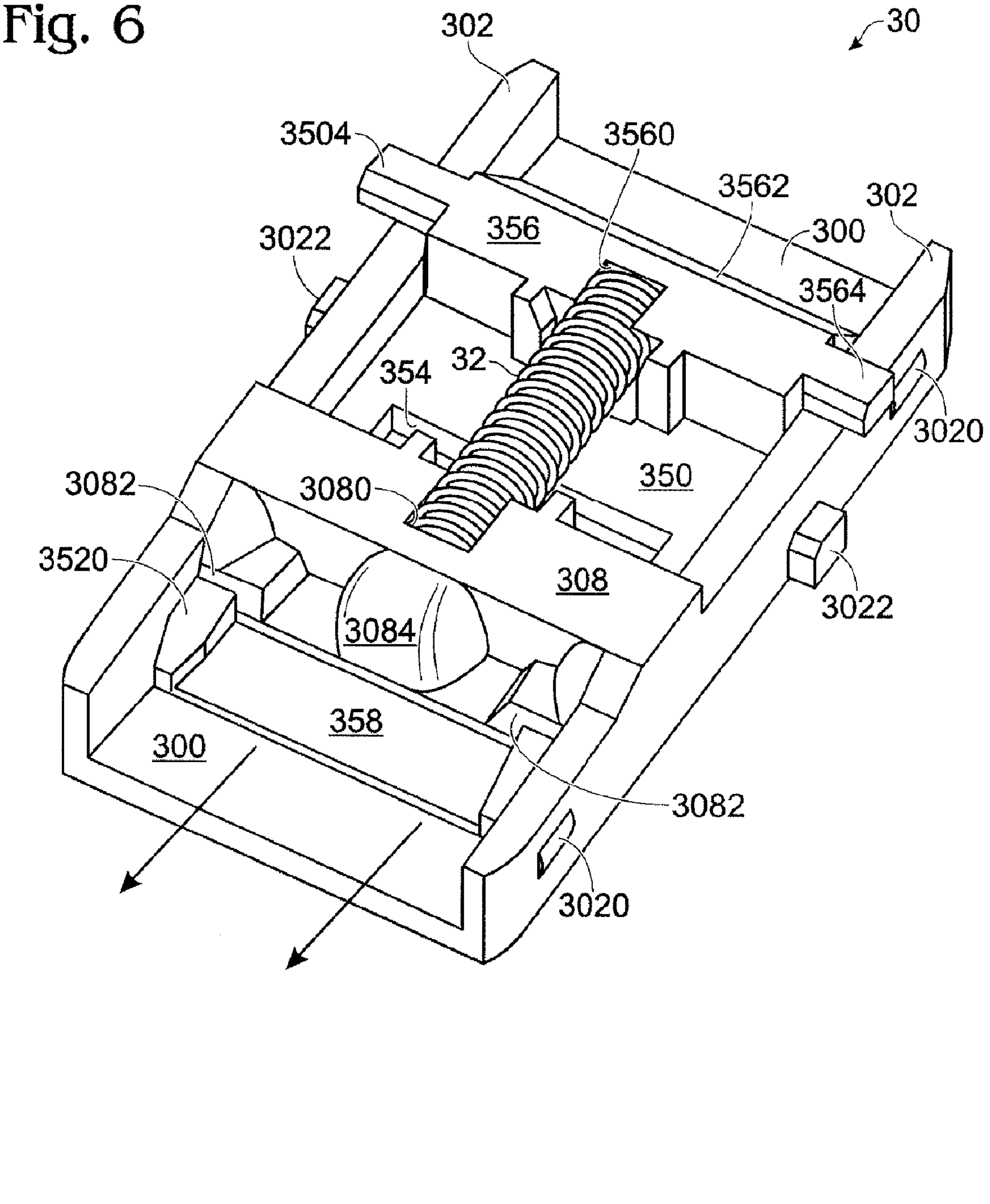
FIG. 6 is a perspective view of the shutter assembly optionally employed in conjunction with the present invention.

As embodied herein and depicted in FIG. 6, a perspective view of the shutter assembly optionally employed in the first embodiment of the present invention is shown. Reference is made to U.S. patent application Ser. Nos. 10/729,685, 10/900,778, and 11/609,793, which are incorporated herein by reference as though fully set forth in its entirety, for a more detailed explanation of various embodiments of the protective shutter assembly 30. The shutter assembly may be optionally employed in any of the embodiments disclosed herein.

When assembled, the upper shutter 350 is inserted into lower shutter 300 until stop members 3520 extend beyond rail guides 3082 and snap into place. This position represents the closed position, wherein the upper transverse structure 356 covers neutral aperture 304 (not shown) and upper base 358 covers hot aperture 306 (not shown). The lower shutter member 300 and the upper shutter member 350 are movable relative to each other from the closed position to the open position in response to being simultaneously engaged by the hot plug blade and the neutral plug blade of an electrical plug. To facilitate this movement, shutter members (300,350) are made from a family of plastics having natural lubricity. These include nylon 6-6, Delrin, and Teflon. Shutter members (300, 350) may be made from a substrate on which these materials are coated, the substrate having a differing flammability or flexural characteristic.

If a foreign object having a width substantially the same as a hot plug blade is inserted into the hot receptacle opening, the shutter assembly remains closed. The foreign object causes ramp 3084, and therefore, lower shutter 300, to move. However, this foreign object insertion does not cause upper shutter 350 to move relative to shutter 300. As a result, the foreign object inserted into the hot receptacle opening strikes base member 358 of the upper shutter. On the other hand, if a foreign object having a width substantially the same as a neutral plug blade is inserted into the neutral receptacle opening, transverse structure 356 will move upper shutter 350 but not move lower shutter 300. Accordingly, the lower base member 308 does not move and the neutral aperture 304 (not shown) is not exposed. Thus, the foreign object inserted into the neutral receptacle opening strikes lower base member 308.

Only when the hot plug blade and the neutral plug blade of an electrical plug simultaneously engage ramp 3084 and ramp 3562, respectively, will the lower shutter member 300 and the upper shutter member 350 move relative to each other from the closed position to the open position. In the open position, the lower hot aperture 306 is aligned with the upper hot contact aperture 354 and, the inward edge of the lower neutral contact aperture 304 is substantially aligned with the outer edge of ramp 3562. In this position, the lower shutter 300 and the upper shutter 350 allow the plug contact blades to pass through the protective shutter 30 and engage the contacts disposed in the interior of the electrical wiring device. On the other hand, a foreign object such as a hairpin is likely to slide off of either side of ramp 3084 or ramp 3562. Obviously, if the foreign object has slid off the ramp, force cannot be applied to the object to open the corresponding shutter.

In another embodiment, the predetermined electrical plug geometry that opens the shutters may include only some of the characteristics that have been described. The geometry may include just one or more of the following: two plug blades separated by a predetermined distance, plug blades contacting the two blade structures simultaneously, a neutral plug blade having a predetermined width, or a hot plug blade having a predetermined width. Plug blade width will not matter if ramps 284 and/or 462 approach the widths of their respective contact structures.

In another embodiment, shutters (300, 350) open in response to the insertion of two objects without particular heed given to their geometries. This may be accomplished by extending the widths of ramp 3084 and ramp 3562 so that regardless of the sizes of the objects, there is nowhere for either or both objects escaping the ramps as they are inserted into the device. As such, it is assured that the two shutters will open.

The movement of the upper shutter 350 and the lower shutter 300 is effected by spring member 32. The spring member 32 is configured to bias the frameless shutter sub-assembly, i.e., lower shutter 300 and upper shutter 350, in the closed position. Spring member 32 is compressed further in the open position and, therefore, opposes movement of the frameless shutter sub-assembly from the closed position to the open position. Accordingly when the electrical plug is removed, the spring moves the frameless shutter sub-assembly from the open position to the closed position. Stated differently, only a single spring is necessary to effect the closed position of the shutter assembly.

As alluded to above, the protective shutter assembly 30 includes a spring retainer mechanism. The spring retainer mechanism includes lower shutter retainer pocket 3080 and upper shutter retainer pocket 3560. The spring retainer mechanism is configured to retain the spring member 32 within the frameless shutter sub-assembly and substantially prevent the spring member from being separated from the frameless shutter sub-assembly. As those of ordinary skill in the art will appreciate, the protective shutter assembly 30 may be dropped and/or exposed to vibrational and/or mechanical forces during automated assembly. As shown in FIG. 4, retainer pockets (3080, 3560) are equipped with retainer lips that prevent the spring member from being jarred loose.

Figure 7:
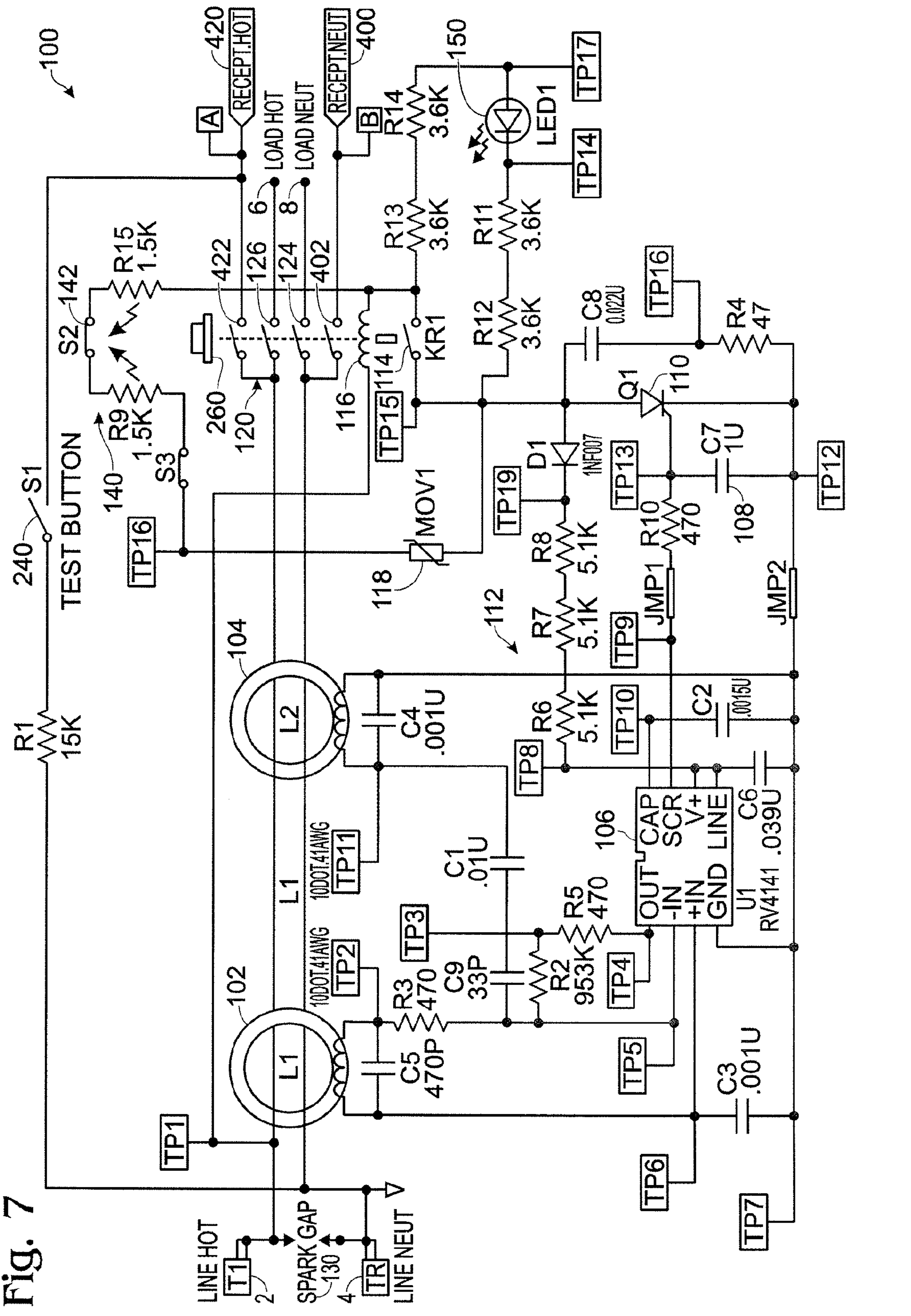
FIG. 7 is a schematic of the electrical wiring device in accordance with yet another embodiment of the present invention.

As embodied herein and depicted in FIG. 7, a schematic of a circuit protection device 10 in accordance with a fourth embodiment of the present invention is disclosed. In this example, the schematic shows a protective device that includes ground fault interrupter circuitry.

Device 10 includes line terminals (2, 4), load terminals (6, 8), and receptacle terminals (400, 420). Again, the load terminals 6, 8 may also be referred to herein as feed-through terminals. As noted above, these terminals may be connected to wiring configured to provide power to downstream receptacles or switches. Receptacle load terminals 400, 420 are configured to mate with an electrical plug to provide power to an appliance or other such user attachable loads. The line terminals 2, 4 are electrically connected to both load terminals 6, 8 and receptacle terminals 400, 420 when device 10 is reset. When in the tripped state, the circuit interrupter 120 disconnects the load terminals from the line terminals. In addition, the circuit interrupter may disconnect at least one feed-through terminal from a corresponding receptacle terminal.

The ground fault circuitry includes a differential transformer 102 which is configured to sense load-side ground faults. Transformer 104 is configured as a grounded neutral transmitter and is employed to sense grounded-neutral fault conditions. Both differential transformer 102 and grounded-neutral transformer 104 are coupled to detector circuit 106. Power supply 112 provides power for GFI detector circuit 106. Detector 106 provides an output signal on output pin 7 based on the transformer outputs. The detector output signal is filtered by circuit 108. Filter circuit 108 filters out noise to thereby substantially reduce the possibility of false tripping. The filtered output signal is provided to the control input of SCR 110. When SCR 110 is turned ON, solenoid 116 is energized. Solenoid 116 actuates the trip mechanism to thereby trip circuit interrupter 120. The trip solenoid 116 is energized until the circuit interrupter trips to remove the fault condition. Accordingly, there is no signal at output pin 7 and SCR 110 is turned OFF. The time that the solenoid remains energized is less than about 25 milliseconds. After the fault condition has been eliminated, circuit interrupter 120 may be reset by way of reset button 260.

The present invention addresses certain end of life conditions by denying power when the device is unable to function. One end of life condition may cause the solenoid to remain energized when a fault condition is not present or when the circuit interrupter is in a tripped state. The solenoid is susceptible to burn-out when SCR 110 is permanently ON. This typically happens when SCR 110 is permanently shorted out. Most solenoids are configured to be energized only momentarily. They tend to burn out if energized for more than about 1 second. Once the solenoid burns out, the circuit interrupter is incapable of being tripped. As a result, the load terminals are permanently connected to the line terminals even when there is a fault condition.

In this embodiment, solenoid burn-out is prevented by an auxiliary switch 114. Auxiliary switch 114 is configured to open when circuit interrupter 120 is in the tripped position. If SCR 110 is shorted, or is permanently ON, auxiliary switch 114 ensures that solenoid 116 is not permanently connected to a current source. Accordingly, if reset button 260 is activated, circuit interrupter 120 resets but immediately trips in response to the trip mechanism, which in turn moves auxiliary switch 114 to the open position before solenoid 116 is able to burn out.

The auxiliary switch 114 provides other benefits. Those of ordinary skill in the art will understand that a metal oxide varistor (MOV) is frequently employed in protective devices to protect the electrical circuit from voltage surges that sometimes occur in the electrical distribution system. The end-of-life failure mode of a MOV is typically an electrical short. The resulting current can be enough to thermally damage the enclosure of the protective device. In one embodiment of the present invention, MOV 118 is connected in series with auxiliary switch 114 and trip solenoid 116 to eliminate most over-current situations. Thus, when MOV 118 reaches end of life and shorts out, trip solenoid 116 is energized to open auxiliary switch 114 and the flow of short circuit current is terminated before any damage ensues.

This embodiment includes an additional indicator 150 disposed in parallel with auxiliary switch 114. As noted above, the auxiliary switch 114 is configured to open when circuit interrupter 120 is in the tripped position. If SCR 38 is shorted, or is permanently ON, auxiliary switch 114 ensures that solenoid 116 is not permanently connected to a current source. Accordingly, if reset button 145 is activated, circuit interrupter 120 resets but immediately trips in response to the trip mechanism, which in turn moves auxiliary switch 114 to the open position before solenoid 116 is able to burn out. The indicator 150 is implemented as a trip indicator, emitting a visual and/or audible indicator signal when circuit interrupter 120 is in the tripped state, i.e., when the auxiliary switch 114 is open. The trip indicator LED 150, therefore, is energized when there is power on the line terminals and the circuit interrupter is in the tripped condition. The indicator 150 is OFF when device 10 is in the reset state. Indicator 150 may be implemented as a red LED or as an audible indicator, or both. The indicator may also be configured to emit a repetitive signal (flashing or beeping).

Of course, each light assembly embodiment described above may be practiced in the GFCI embodiment of FIG. 7. The hot receptacle terminal structure 420 is connected to the light assembly 200 by way of connection "A". The neutral receptacle terminal structure 400 is connected to the light assembly 200 by way of connection "B.

In yet another embodiment of the present invention, a secondary power source, such as a battery or a charged capacitor, may be disposed within the housing 12 as a back-up power source when the primary AC power source provided by the electrical distribution system has failed. Reference is made to U.S. patent application Ser. No. 11/294,167, which is incorporated herein by reference as though fully set forth in its entirety, for a more detailed explanation of a secondary power source.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. An electrical wiring device comprising:

a housing including a plurality of line terminals;

a cover assembly coupled to the housing, the cover assembly including at least one set of receptacle openings disposed on either side of a central portion of the cover assembly;

a plurality of receptacle terminals disposed in the housing, each of the plurality of receptacle terminals being coupled to a corresponding one of a plurality of load terminal structures, each of the plurality of receptacle terminals being in communication with a corresponding one of the at least one set of receptacle openings;

a light assembly disposed in the central portion of the cover assembly and coupled to the plurality of line terminals or the plurality of load terminals, the light assembly having a light transmission region disposed in the central portion, the light transmissive region occupying a substantial portion of a width of the cover assembly;

an automatic control mechanism coupled to the light assembly and configured to selectively drive the light assembly from a deenergized state to a light emitting state in response to a predetermined stimulus; and a manual control mechanism coupled to the light assembly and configured to selectively regulate the amount of light transmitted by the light assembly when in the light emitting state.

2. The device of claim 1, further comprising at least one protective shutter assembly disposed in the cover assembly between each set of the at least one set of receptacle openings and the corresponding receptacle terminals, the at least one protective shutter assembly being configured to move from a closed position to an open position only in response to engaging a set of plug blades to thereby establish electrical continuity between the plurality of receptacle terminals and the set of plug blades.

3. The device of claim 2, wherein each protective shutter assembly is a frameless shutter assembly comprising a first shutter member and a second shutter member configured to move from a closed position to an open position only in response to engaging a set of plug blades having at least one predetermined plug blade geometry.

4. The device of claim 1, wherein the automatic control mechanism includes a light sensor and the predetermined stimulus includes an ambient light level.

5. The device of claim 4, wherein the automatic control feature includes a control circuit configured to regulate the intensity of light emitted by the light assembly in response to the amount of ambient light detected by the light sensor.

6. The device of claim 5, wherein the intensity of the light emitted by the light assembly increases as the intensity of the ambient light decreases, or the intensity of the light emitted by the light assembly increases as the intensity of the ambient light increases.

7. The device of claim 1, wherein the manual control mechanism includes a slide, rotary, or push-button actuator whose manual adjustment serves to regulate the intensity of light emitted by the light control assembly.

8. The device of claim 1, wherein the manual control feature includes a switch that selectively drives the light control assembly either to the deenergized state or to the energized state regardless of the condition of the predetermined stimulus.

9. The device of claim 1, wherein the automatic control mechanism includes a sensor disposed under a lens and the manual control feature includes a user accessible actuator, the lens or the user accessible actuator, or both, being disposed in the central portion of the cover assembly.

10. The device of claim 1, further comprising:

a fault detection assembly coupled to the plurality of line terminals, the fault detection assembly being configured to provide a fault detection output in response to detecting a fault condition; and a circuit interrupter coupled between the plurality of line terminals and a plurality of load terminals, the circuit interrupter including a first set of contacts, the first set of contacts being configured to establish at least one electrically continuous path between the plurality of line terminals, the plurality of load terminals, and the plurality of receptacle terminals in a reset state, the first set of contacts being configured to disconnect the at least one electrically continuous path in response to the fault detection output to enter a tripped state.

11. The device of claim 10, wherein and the at least one electrically continuous path includes at least one first electrically continuous path between the plurality of line terminals and the plurality of load terminals and at least one second electrically continuous path between the plurality of line terminals and the plurality of receptacle terminals.

12. The device of claim 10, wherein the light assembly includes a light indicator circuit and a plurality of light emitting diodes disposed in series, the light indicator circuit being coupled to the line terminals when the device is driven into the reset state.

13. The device of claim 10, further comprising a reset mechanism disposed in a central portion of the front cover assembly and coupled to the circuit interrupter, the reset mechanism being configured to generate the predetermined stimulus when it drives the device from the tripped state to the reset state.

14. The device of claim 10, further comprising a trip indicator disposed in a central portion of the front cover assembly and coupled to the plurality of line terminals, the trip indicator being energized in the tripped state.

15. The device of claim 10, wherein the fault detection assembly is disposed on a first printed circuit board and the light assembly is disposed on a second printed circuit board.

16. The device of claim 10, wherein the light assembly comprises:

a plurality of light emitting diodes configured to be responsive to the automatic control mechanism and the manual control mechanism; and a lens element disposed in a central portion of the cover assembly over the light emitting diodes.

17. The device of claim 16, wherein the automatic control mechanism includes an ambient light sensor coupled to a transistor circuit, the transistor circuit being configured to energize the light emitting diodes in response to detected ambient light falling below a predetermined threshold.

18. The device of claim 17, wherein the manual control mechanism comprises a dimmer circuit coupled to a user accessible control element and the light emitting diodes, the dimmer circuit being configured to regulate an intensity of light being emitted by the light emitting diodes.

19. The device of claim 1, wherein the light assembly further comprises:

a reflector member disposed in the central portion of the cover assembly below the light transmissive region;

a plurality of light emitting diodes disposed in the reflector member; and a lens element disposed in the light transmissive region and covering the reflector member, the lens element being configured to refract light emitted by the light emitting diodes in accordance with a predetermined pattern.

20. The device of claim 19, wherein the reflector member further comprises a sensor tower configured to accommodate an ambient light sensor coupled to the control circuit, the sensor tower being configured to position the ambient light sensor within the central portion proximate the lens element, the sensor tower being configured to shield the ambient light sensor from light being emitted by the light emitting diodes.

21. An electrical wiring device comprising:

a housing including at least one hot connection mechanism and at least one neutral connection mechanism;

a cover assembly coupled to the housing, the cover assembly including at least one set of receptacle openings disposed on either side of a central portion of the cover assembly;

a plurality of receptacle terminals disposed in the housing and coupled to the at least one hot connection mechanism and the at least one neutral connection mechanism, the plurality of receptacle terminals being in communication with each of the at least one set of receptacle openings;

a light assembly disposed in the central portion of the cover assembly and coupled to the at least one hot connection mechanism and the at least one neutral connection mechanism, the light assembly having a light transmission region disposed in the central portion, the light transmissive region occupying a substantial portion of a width of the cover assembly; and a light control mechanism coupled to the light assembly and configured to selectively drive the light assembly from a deenergized state to a light emitting state in response to a predetermined stimulus, the light control mechanism also being configured to selectively regulate the amount of light transmitted by the light assembly when in the light emitting state.

22. The device of claim 21, wherein the light control mechanism includes a manual control mechanism having one or more of a slide, rotary, or push-button actuator configured to regulate an intensity of light emitted by the light assembly.

23. The device of claim 22, wherein the manual control mechanism includes a switch that selectively drives the light control assembly either to the deenergized state or to the energized state regardless of the condition of the predetermined stimulus.

24. The device of claim 21, wherein the light control mechanism includes an automatic control mechanism configured to selectively drive the light assembly from a deenergized state to a light emitting state in response to the predetermined stimulus.

25. The device of claim 24, wherein the predetermined stimulus includes an ambient light condition.

* * * * *